United States Patent
Ruelke et al.

(10) Patent No.: US 11,763,022 B2
(45) Date of Patent: Sep. 19, 2023

(54) ARTIFICIAL INTELLIGENCE QUERY SYSTEM FOR PROTECTING PRIVATE PERSONAL INFORMATION

(71) Applicant: MOTOROLA SOLUTIONS, INC., Chicago, IL (US)

(72) Inventors: Charles R. Ruelke, Coral Springs, FL (US); Abhaykumar Kumbhar, Plantation, FL (US); Peter H. Mills, Sunrise, FL (US); Niyanka D. Patel, Tamarac, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 22 days.

(21) Appl. No.: 17/650,584

(22) Filed: Feb. 10, 2022

(65) Prior Publication Data
US 2023/0252178 A1    Aug. 10, 2023

(51) Int. Cl.
*G06F 21/62* (2013.01)
*G06F 16/28* (2019.01)
*G06F 16/2452* (2019.01)

(52) U.S. Cl.
CPC ...... *G06F 21/6227* (2013.01); *G06F 16/2452* (2019.01); *G06F 16/285* (2019.01); *G06F 21/6245* (2013.01)

(58) Field of Classification Search
CPC .............. G06F 16/285; G06F 16/2452; G06F 21/6254; G06F 21/6245; G06F 21/6227; G06N 20/00
See application file for complete search history.

(56) References Cited

U.S. PATENT DOCUMENTS

| | | | |
|---|---|---|---|
| 8,024,339 B2 | 9/2011 | Barker et al. | |
| 9,055,121 B2 | 6/2015 | Rajakarunanayake et al. | |
| 10,282,553 B1* | 5/2019 | Schroeder | G06F 21/6254 |
| 10,417,451 B2 | 9/2019 | Park et al. | |
| 10,558,823 B2 | 2/2020 | Schroeder et al. | |
| 10,824,751 B1* | 11/2020 | Kurian | G06F 16/282 |
| 11,093,533 B2 | 8/2021 | Ezen Can et al. | |
| 2010/0169343 A1* | 7/2010 | Kenedy | G06F 16/9535 707/758 |
| 2021/0110062 A1 | 4/2021 | Oliner et al. | |
| 2022/0253545 A1* | 8/2022 | Sloane | G06F 21/31 |
| 2023/0058906 A1* | 2/2023 | Jansen | G06F 21/84 |

* cited by examiner

*Primary Examiner* — Robert W Beausoliel, Jr.
*Assistant Examiner* — Cheryl M Shechtman
(74) *Attorney, Agent, or Firm* — Michael Best & Friedrich LLP

(57) ABSTRACT

Methods and systems for generating a response to a query using an AI engine. One method includes translating a received query into a profile comprised of at least a query type and a priority. The method further includes collecting, based on the profile, a first set of data items from a first data file storing data categorized as general public data and a second set of data items from a second data file storing data categorized as personal private information and applying an AI correlation engine to the second set of data items to determine PPI-agnostic relevancy indicators for PPI included in the second set of data items. The method further includes masking, based on the query cluster profile, the second set of data items by replacing the PPI included in the second set of data items with the PPI-agnostic relevancy indicators.

20 Claims, 7 Drawing Sheets

ARTIFICIAL INTELLIGENCE QUERY SYSTEM FOR PROTECTING PRIVATE PERSONAL INFORMATION

BACKGROUND OF THE INVENTION

Private Personal Information (PPI) is personal information not generally publicly available and may include, for example, medical records, school records, juvenile records, financial records, religious affiliations, military records, and security ratings. Valid public safety interest (VPSI) is information that a reasonable person would consider pertinent to a Public Safety and associated agencies in the performance of their responsibilities. These two categories of information have conflicting priorities and balancing these priorities is complex and multi-faceted. For example, first responders may respond to an incident involving individuals with injuries requiring immediate medical intervention. However, relevant medical information of the individuals, such as, for example, allergic sensitivities, prescribed medications, and known compromised physiology, is generally considered PPI and, thus, is not readily available when an individual is incapacitated. Similarly, medical prescription information may be considered PPI but without access to such information, investigators tracking controlled substances may not be able to identify purchasing patterns or other activities representing potentially illegal behavior.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
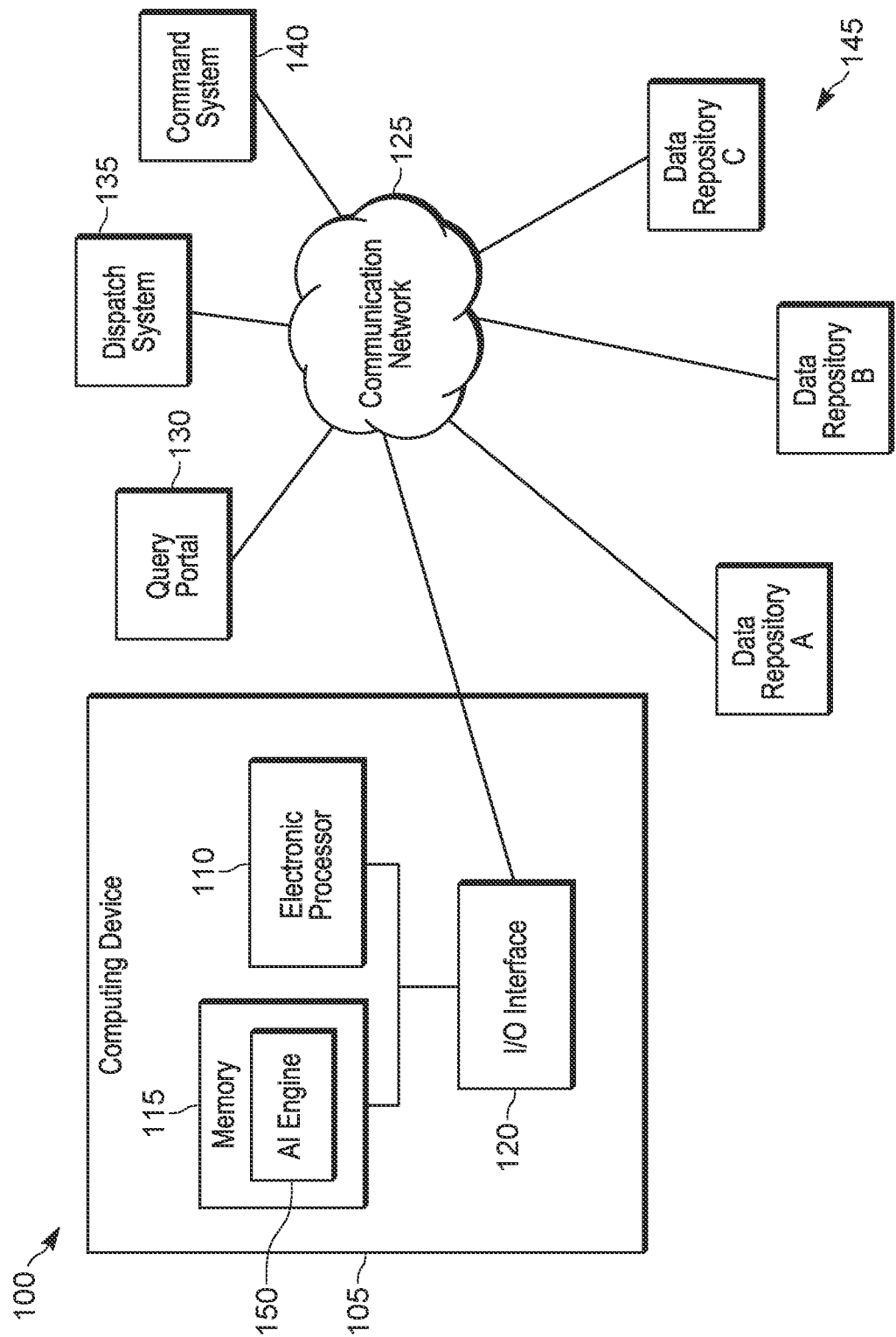
FIGS. 1A and 1B are block diagrams of an artificial intelligence (AI) query system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, private personal information (PPI) and vital public safety information (VPSI) have conflicting priorities and balancing these priorities is a complex and multi-faceted challenge. Furthermore, manual decision-making with respect to these priorities can be influenced by prejudices and assumptions. Accordingly, embodiments described herein provide an artificial intelligence (AI) engine configured to arbitrate associations between query requests and existing and/or accessible information so as to provide uniform access to information consistent with existing law and public policies governing privacy. When direct access to PPI is not permitted due to policy or legal prohibitions, the AI engine may generate associated information that may be substituted for the actual PPI, wherein the AI information provides an "indication" that certain PPI data exists (without full disclosure of the actual data) along with other relevant information, which may include but is not limited to, authentication of source and time of any query, correlation indicators that gauge the relevance of specific PPI data to a particular query request, weighting factors indicating the priority of the PPI data relative to the query and public safety interests, and confidence intervals (CI) that provide guidance as to the probability that specific PPI data that may be masked should be made accessible in context of compelling VPSI. Controlling access to PPI and the generation of AI information related to PPI as performed by the AI engine is designed to provide appropriate trade-offs between PPI privacy protections and public safety interests for disclosure agnostic to human prejudices and assumptions. Accordingly, the AI engine acts as an arbitrator between the conflicting priorities of PPI and VPSI and is configured to highlight relevant information (for example, who, what, when, and where) while masking PPI data specifics as necessary to comply with relevant legal and public policy constraints. Data masking, as described herein, also known as data obfuscation, not only hides the actual data using modified content characters or numbers but modifies the information using the AI engine to facilitate generation of correlation factors that indicate the relevancy and priority (among other factors) of particular PPI data to a specific query without revealing specific PPI details. This type of data masking method differs from current practices that simply "redact" PPI data completely or excise any public disclosure of any extant PPI data without acknowledging the existence of the PPI, so as to completely prevent any inferences from being concluded concerning specific PPI data. The legacy redaction and excision practice of PPI precludes any consideration by public safety agencies to pursue full public disclosure of targeted PPI using appropriate legal process, as may be warranted for the greater public good. In other words, the data masking as taught herein creates an alternative version of data that cannot be specifically identifiable while still providing some indication of data correlation for further review by authorized individuals as may be deemed appropriate (for example, subject to human approval for follow-up actions). Accordingly, the AI engine as described herein provides a bridge between protecting privacy and the public's right, or need, to know regarding potential public safety risks by providing a level of understanding that relevant information may exist without revealing confidential information.

For example, one embodiment described herein provides an artificial intelligence (AI) query system. The AI query system includes a query portal, an AI polling gird, and an AI privacy gateway. The query portal is configured to translate a request for information into a query cluster profile, wherein the query cluster profile includes a query type and a priority. The AI polling grid is configured to access, based on the query cluster profile, a plurality of data files, wherein the plurality of data files includes a first data file storing data items categorized as general public data and a second data file storing data items categorized as personal private information (PPI). The AI polling grid is also configured to collect a first set of data items associated with the request for information from the first data file, collect a second set of data items associated with the request for information from the second data file, apply an AI correlation engine to the second set of data items to determine PPI-agnostic relevancy indicators for PPI included in the second set of data items, and mask, based on the query cluster profile, the second set of data items by replacing the PPI included in the second set of data items with the PPI-agnostic relevancy indicators. The AI privacy gateway is configured to receive the first set of data items and the second set of data items, as masked, from the AI polling grid, generate an integrated data package based on the first set of data items and the second set of data items, as masked, and communicate the integrated data package, as a response to the request for information, to a data repository accessible by authorized users of a public safety agency.

Another embodiment provides a method for generating a response to a request for information using an AI engine. The method includes receiving the request for information and translating the request for information into a query cluster profile, the query cluster profile comprised of at least a query type and a priority. The method also includes accessing, with the AI engine based on the query cluster profile, a plurality of data files, the plurality of data files including a first data file storing categorized as general public data and a second data file storing data categorized as personal private information (PPI), collecting, with the AI engine, a first set of data items associated with the request for information from the first data file, collecting, with the AI engine, a second set of data items associated with the request for information from the second data file, and applying, with the AI engine, an AI correlation engine to the second set of data items to determine PPI-agnostic relevancy indicators for PPI included in the second set of data items. The method further includes masking, with the AI engine based on the query cluster profile, the second set of data items by replacing the PPI included in the second set of data items with the PPI-agnostic relevancy indicators, generating an integrated data package based on the first set of data items and the second set of data items, as masked, and communicating the integrated data package, as the response to the request for information, to a data repository accessible by authorized users of a public safety agency.

A further embodiment provides a non-transitory computer-readable medium storing instructions, that when executed by an electronic processor, perform a set of functions. The set of functions includes receiving a request for information and translating the request for information into a query cluster profile, the query cluster profile comprised of at least a query type and a priority. The set of functions also includes accessing, based on the query cluster profile, a first data file storing data categorized as general public data with a first query interface to collect a first data bundle associated with the request for information, and accessing, based on the query cluster profile, a second data file storing data categorized as PPI with a second query interface to collect a second data bundle associated with the request for information. The set of functions further includes applying, at the second query interface, an AI correlation engine to determine PPI-agnostic relevancy indicators of PPI included in the second data bundle, masking, based on the query cluster profile, the PPI included in the second data bundle by replacing the PPI with the PPI-agnostic relevancy indicators, generating an integrated data package based on the first data bundle and the second data bundle, as masked, and communicating the integrated data package, as a response to the request for information, to a data repository.

FIG. 1A is a block diagram of an AI query system 100 in accordance with some embodiments of the present invention. The AI query system 100 is configured to respond to query (also referred to herein as "a request for information"). In some embodiments, the query is associated with an emergency call (for example, a 9-1-1 call) received from a dispatch system. However, in other embodiments, the query may originate separate from an emergency call. For example, the query may be generated as part of a background check, a police investigation, medical status or vaccination authentication, or the like. The response to the query includes information collected from one or more data repositories, wherein the collected data is authenticated, masked (as needed), and presented to a command central operator, such that release of PPI information is scaled based on one or more selected parameters.

As illustrated in FIG. 1A, the AI query system 100 includes a computing device 105 configured to access one or more external systems, networks, or devices, such as, for example, one or more governmental databases or cloud services. In some embodiments, the computing device 105 includes one or more computers, terminals, tablets, or servers, and the functionality described herein as being performed via the computing device 105 can be performed by one device or distributed among multiple devices, including one or more servers configured to provide hosted or cloud services. The computing device 105 is illustrated in FIG. 1A as a single device for sake of brevity. However, in embodiments where multiple devices are used to provide the functionality described herein as being provided by the computing device 105, the other devices are similarly structure and operate similar to the computing device 105 illustrated in FIG. 1A and described herein.

The computing device 105 includes a plurality of electrical and electronic components that provide power, operational control, and protection to the components and modules within the computing device 105. As illustrated in FIG. 1A, in some embodiments, the computing device 105 includes an electronic processor 110 (for example, an electronic microprocessor, microcontroller, or similar device), a memory 115 (for example, non-transitory, computer-readable memory), and an input/output (I/O) interface 120. The computing device 105 may include additional or alternative components, including additional electronic processors and memory, or application specific integrated circuits (ASICs), as well as one or more input devices, output devices, or a combination thereof The components of the computing device 105 may be connected in various ways including, for example, a local bus. The electronic processor 110 is communicatively coupled to the memory 115 and executes instructions stored on the memory 115. The electronic processor 110 is configured to retrieve from the memory 115 and execute, among other things, instructions related to the control processes and methods described herein.

Figure 1B:
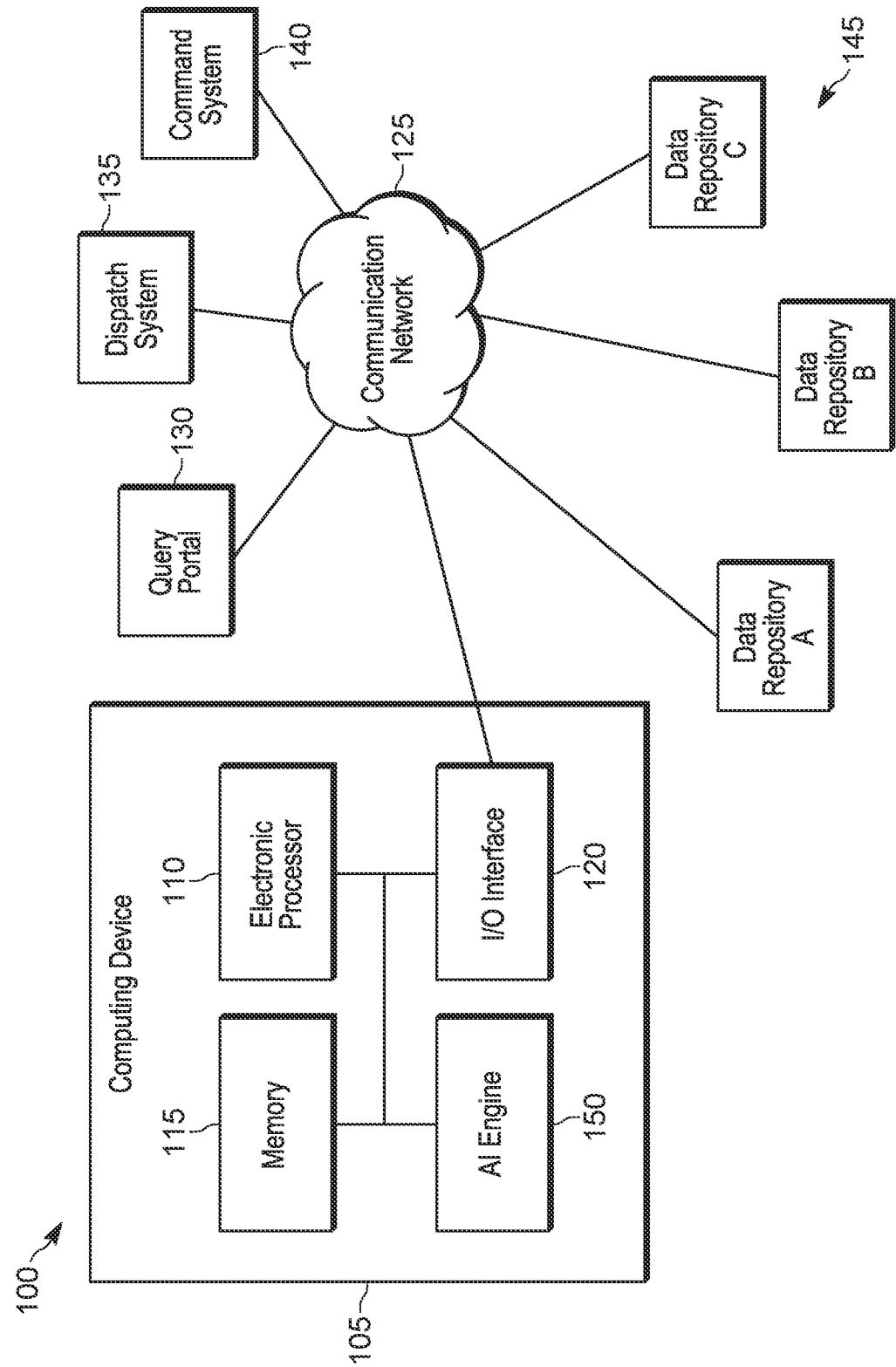

In some embodiments, as illustrated in FIG. 1B, rather than or in addition to including a general processor configured to execute software, such as an AI engine as described below, the computing device 105 includes a dedicated processing unit with specialized modeling software and statistical routines as exemplified in an AI engine 150. In this embodiment, the AI engine 150 as described is realized as a combination of a program in memory that utilizes a designated auxiliary processor or digital signal processor (DSP) in addition to software. In particular, the AI engine 150 may include specialized software stored in the memory 155 that is processed within an auxiliary processing unit (APU), a digital state machine, one or more digital signal processors (DSPs), or a combination thereof to form the AI engine 150. As described below, input queries received at a query portal 130 may be authenticated correlated, prioritized, or otherwise manipulated relative to PPI data resident in data repositories A, B, C, or a combination thereof (referred to herein collectively or individually as data repositories 145). As also described in more detail below, the AI engine 150 utilizes a set of predefined algorithms, models, hardware accelerators, or combination thereof, to translate actual PPI data into generic "metric indicators" suitable for, and relevant to, public safety considerations. In addition, the AI engine 150 may include feedback mechanisms whereby "machine learning" is realized so as to track the frequency of particular queries, query type, query originating sources, or a combination thereof and adapt the governing parameters of the AI engine 150 so as to augment computational efficiencies and correlation accuracies of future processing tasks. Accordingly, the AI engine 150 performs a significant portion of the query response functionality described herein.

Figure 2:
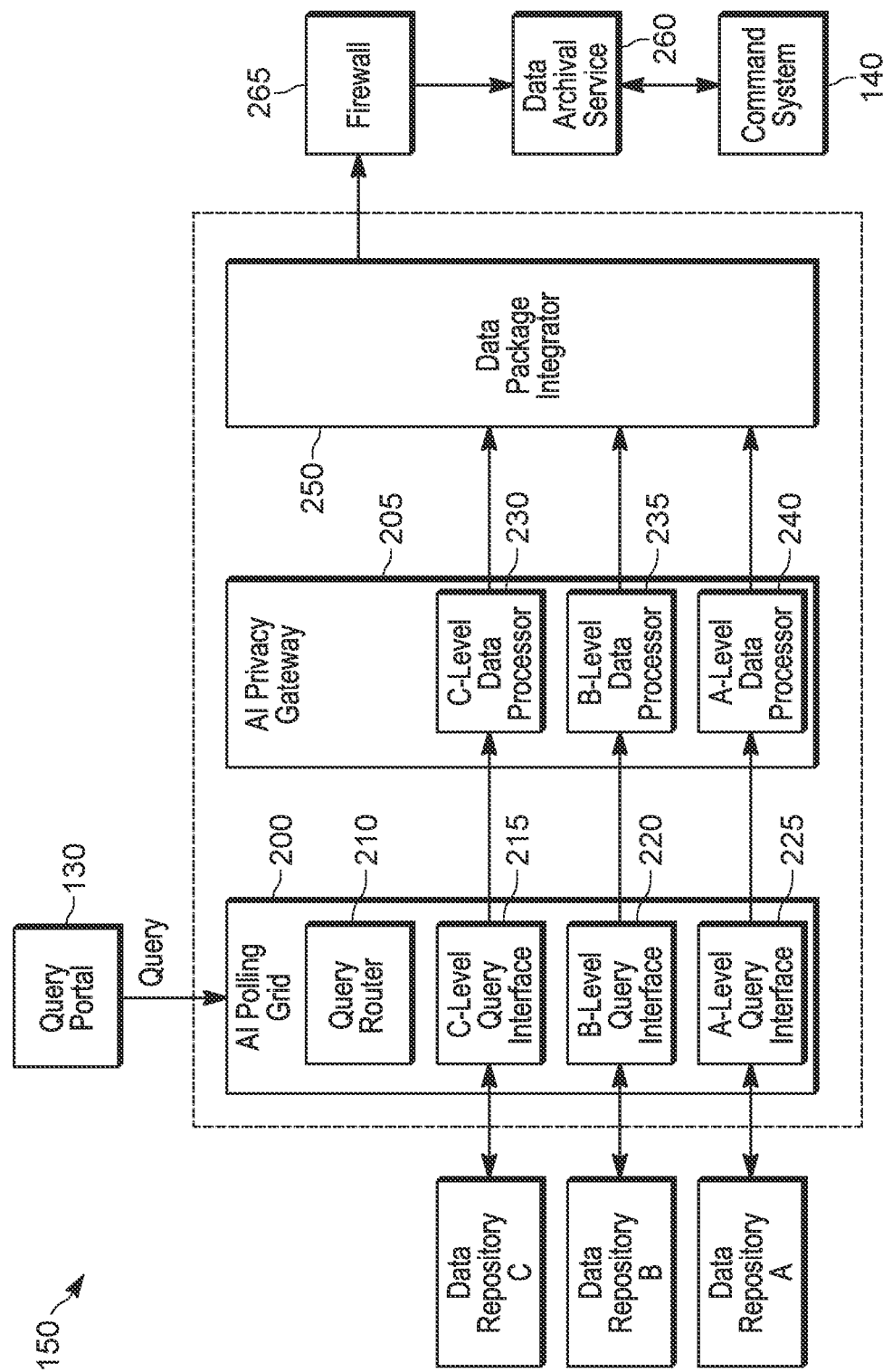
FIG. 2 is a block diagram of an AI engine included in the AI query system of FIGS. 1A and 1B in accordance with some embodiments.

The input/output interface 120 is configured to transmit data to and receive data from one or more devices, networks, or systems external to the computing device 105. For example, as illustrated in FIG. 2, the computing device 105 (through the input/output interface 120) is configured to communicate with a communication network 125. The communication network 125 may be implemented using wired communication components, wireless communication components, or a combination thereof and may include various types of networks or interconnections, such as, for example, a cellular network, a land mobile radio network, a trunked radio network, a wide area network (such as, for example, the Internet), a local area network (such as, for example, a Wi-Fi® network), a short-range wireless network or connection, or a combination of the foregoing. It will be appreciated that the computing device 105 may be configured to communicate with different external devices using different networks and, in some embodiments, may communicate with one or more external devices through a direct connection as compared to a network connection. For example, in some embodiments, the computing device 105 may communicate with one external device over a local area network and may communicate with another external device over a wide area network.

As illustrated in FIGS. 1A and 1B, the AI query system 100 also includes a query portal 130, a dispatch system 135, a command system 140, and one or more data repositories (illustrated as data repository A, data repository B, and data repository C in FIGS. 1A and 1B and collectively and individually referred to herein as "a data repository 145" or "one or more data repositories 145"). Each data repository stores a plurality of data files, wherein the data files include data categorized based on a type of data. For example, a data repository (one or more databases or other servers) storing data files of general publicly available data may be considered a general public data repository. In contrast, a data repository storing data files of confidential PPI may be considered a PPI data repository, and a data repository storing data files of secure secret data may be considered a secret data repository.

The AI query system 100 may include fewer or additional devices, and the specific configuration and number of devices as illustrated in FIGS. 1A and 1B are provided as illustrative examples of the system 100. Also, the data types and associated classifications (public data, confidential PPI, and secure secret data) may be more generic or specialized than the example data classifications delineated herein (for example, public data, confidential PPI, and secret data). In addition, the AI query system 100 may include other components, such as for example, firewalls, routers, and the like not described herein. Furthermore, functionality described herein may, in some embodiments, be distributed among components of the system 100 in various ways or combined into single components in various ways. For example, in some embodiments, the computing device 105 may be configured to perform functionality described herein as being performed via the query portal 130.

The dispatch system 135 may be configured to receive and process emergency calls (for example, 9-1-1 calls) and may be configured to route a call to one or more systems for processing. This routing may be performed automatically, via a human operator through a dispatch interface, or a combination thereof. As illustrated in FIG. 1, the dispatch system 135 may communicate (directly or via the communication network 125) with the query portal 130. The query portal 130 receives a routed emergency call from the dispatch system 135 (or information regarding the same) and submits a query to the computing device 105 based on the routed call. The query portal 130 may also log information regarding a call and received queries so as to assign a priority to the query according to various rules, public policies, legal requirements, system configurations, or a combination thereof. As noted above, in some embodiments, the query portal 130 is also configured to receive a request for information from other systems or devices (independent from an emergency call) or from a user. These queries may originate from businesses or agencies authorized to perform background checks, sell or distribute medications, sell or distribute firearms, or any other function as may require a rigorous review of personal information in the service of public safety interests. The query portal 130 processes these requests for information as a query similar to a routed emergency call as described herein. Accordingly, as described herein, the computing device 105 receives a query from the query portal 130, wherein the query may originate from or be associated with an emergency call received via the dispatch system 135 or as an independent request.

As described in more detail below, in response to receiving query at the query portal 130, the computing device 105 (through the AI engine 150) may interrogate one or more data repositories and compile appropriate information that is to be communicated to the command system 140. Each repository may store data files with one or more classifications of data. For example, an "open" or "public" data repository stores general public data that may be accessed by the general public, including private investigators and law enforcement. These data repositories may be referred to herein as c-level data repositories and may include, for example, data repositories storing department of motor vehicle (DMV) files, public domain criminal records, legal actions, public financial metrics, social media profiles, phone numbers, or addresses. A "public-private" data repository stores confidential PPI and is typically held in privately-owned servers that require authorization for access. These data repositories may be referred to herein as b-level data repositories and may include, for example, data repositories storing medical records, academic records, juvenile justice records, and surveillance records. And "closed" or "secure/secret" data repositories are generally highly restricted from most inquiries pending extraordinary intervention, such as issued security clearances, administrative override, or changes in the law. Information stored in these types of data repositories may be generally considered in the "public interest" to keep secret. These data repositories may be referred to herein as c-level data repositories and may include, for example, classified financial data, military information, surveillance information, investigation information, governmental intelligence data (for example, federal bureau of investigation (FBI) information or national security agency (NSA) information). The preceding description of a three-tiered, data type classification strategy is illustrative in nature, and is not intended to limit the applicable scope of embodiments of the present invention. Specifically, other data classification strategies may be adopted, and the current AI query processing system may be appropriately adjusted to accommodate any given classification strategy. For example, a five-tiered alpha-numeric rating (for example, a1 through e5, where each numeric value is associated with a particular data type) may be adopted by appropriately adjusting the query interfaces 215, 220, 225 without departing from the novelty of the present invention.

As also described in more detail below, the computing device 105 processes the information collected from the data repositories to generate an integrated data package that may be provided as a response to the received query, wherein the integrated data package includes data from c-level data repositories in combination with data from one or more b-level data repositories, one or more a-level data repositories, or a combination thereof. With respect to any data from b-level data repositories or a-level data repositories, the computing device 105 applies one or more AI models to identify what data to present as a response to the received request, including what data to present in a masked version to, for example, provide weighted indications of PPI without divulging PPI specifics. The data identified by the computing device 105 may be included within one or more graphical user interfaces (GUI) or other means of communicating information to a command central operator via a terminal included in the command system 140. The command central operator may use the provided information to manage resources for a particular incident or task force or investigation.

FIG. 2 is a block diagram illustrating the AI engine 150 according to some embodiments. As illustrated in FIG. 2, the AI engine 150 includes a plurality of modules. It will be appreciated that these modules may include, but are not limited to, software routines executable by the electronic processor 110, one or more task-specific digital state machines, one or more application specific digital processors, field programmable gate arrays (FPGAs), or other means utilizing software, hardware, or a combination thereof, to perform a set of functions as described herein. The functionality described herein as being performed by a particular module may be combined and distributed in various ways, and the modules illustrated in FIG. 2 are provided as one example distribution of functionality. Also, as noted above, the computing device 105 may include multiple devices. Accordingly, in some embodiments, the modules illustrated in FIG. 2 may be associated with the same device or different devices or, in some embodiments, with different electronic processors within the same device.

As illustrated in FIG. 2, the AI engine 150 includes an AI polling grid 200 and an AI privacy gateway 205. The query portal 130 may receive a query and parse the query so as to translate the request for information into a cluster profile. As described in more detail below, the cluster profile may include one or more parameters that efficiently represent the query to the AI engine 150, wherein the one or more parameters may include, but are not limited to, a query source, a query type, a query time stamp, a set of query indicators to facilitate selection of AI model states, a query authorization, authentication requirements, a query priority, or a combination thereof. A query source indicates the origination source of the query and may include, but is not limited to, a geographic location, an agency type (federal, state, local, or private contractor), an authorization (military, law enforcement, or contractor), or an agency role (educational, medical, or judicial). A query time stamp includes time and date information regarding when the request for information is submitted into the system and may be augmented with additional information by the AI engine 150, such as, for example, a time when processing of the query was initiated and when processing was completed. Query indicators are AI model specific domains and sub-categories used to facilitate the selection of an AI model (or models) and variable(s) that are best suited to process the query. A query authorization includes credentials that certify that the query is authorized by the agency purported to be the source of the query. Query authorizations may be independently verified manually or by the AI model as part of final authorization of access to various levels of PPI data. Query authentication verifies the relevant credentials and may serve to enable access to some PPI information or may actually limit access to other PPI information that may be unrelated to the request for information, depending, for example, on credentials, authorizations, authentications, or a combination thereof. A query priority is a priority rating given at the time of submission of the query that indicates the time sensitive nature of the request. A query priority may also include a weighting factor associated with the query source so as to emphasize the importance of the query relative to other processing tasks being executed. A query priority may be changed as warranted by the query source or other system administrators as circumstances change. These parameters may be part of a query cluster profile and are used to select a proper AI model during query processing and to execute the request for information from a plurality of data repositories, where the data repositories are not necessarily the same relative to the types of information they contain, or the authorization needed to gain access to said information.

The cluster profile is processed by a query router 210 included in the AI polling grid 200. The query router 210 uses the cluster profile to identify the one or more data repositories 145 to access. The query router 210 may be configured to automatically identify the one or more data repositories 145 to query based on the query type included in the received cluster profile, which may be a classification defined in the context of public safety obligations. In some embodiments, in addition to data repositories defined via the cluster profile, a user may manually identify one or more data repositories for a particular query. For example, in some embodiments, the system 100 provides a user interface where an authorized user can manually identify data repositories for a particular query. In some embodiments, this user interface is provided as part of the query portal 130 or the query router 210.

For each identified data repository, the query router 210 identifies a type or security rating for the data repository (for example, c-level, b-level, or a-level) and transmits an instruction to an appropriate query interface to the data repository based on the identified type. For example, as illustrated in FIG. 2, the AI polling grid 200 includes a c-level query interface 215, a b-level query interface 220, and an a-level query interface 225. Each of these query interfaces 215, 220, and 225 are representative of a particular type of data repository (stored data files) based on the associated data type classification of data that is to be collected. This means that c-level query interface 215 may interface to one or more data repositories, or appropriately partitioned data management systems, where the relevant data being accessed at the c-level query interface 215 may be classified as "public domain." In like manner, query interfaces 220 and 225 may interface with one or more data repositories, or appropriately partitioned data management system, where each query interface 220 and 225 accesses relevant data classified as PPI and secure/secret, respectively. Accordingly, the AI query system 100 utilizes AI polling grid 200 so as to provide a compartmentalized system for accessing varied data systems based on the different types of data privacy classification using tailored query strategies.

Protection of private information is further augmented at AI polling grid 200 in that query interfaces 215, 220, and 225 perform an initial processing of raw data so as to appropriately identify and mask PPI, secret data, or both. This initial masking at the query interfaces 215, 220, and 225 generates a first level of correlation factors as dictated by the AI engine 150 and query cluster profile information, so that subsequent data manipulation and communication do not compromise the raw data that is being protected. Because query interfaces 215, 220, and 225 perform an initial masking operation, subsequent masking or post-processing following the polling grid 200 only further obfuscates private data, thereby precluding inadvertent disclosure of inappropriate information to unintended audiences. This duality of compartmentalizing both data access and initial masking of PPI or secure data to a specific query interface node compliant with legal and policy precedence agnostic to manual intervention ensures queries are handled equally and impartially without inappropriate bias related to who is the target of the query or who is the query originator.

As illustrated in FIG. 2, the c-level query interface 215 is configured to communicate with one or more c-level data repositories (data repository C), the b-level query interface 220 is configured to communicate with one or more b-level data repositories (data repository B), and the a-level query interface 225 is configured communicate with one or more a-level data repositories (data repository A). In some embodiments, the AI engine 150 performs adaptive tiering, wherein the AI engine 150 is adapted responsively to changes in data accessibility and its associated classifications. For example, law changes, legal decisions, or release authorizations may cause data classified as general public data to revert to PPI or secret data, data classified as PPI to be re-categorized as general public data or secret data, data classified as secret data to be re-categorized as general public data or PPI, or any combination thereof.

As illustrated in FIG. 2, the AI privacy gateway 205 includes a data processor configured to communicate with one of the query interfaces 215, 220, and 225. For example, the AI privacy gateway 205 includes a c-level data processor 230, a b-level data processor 235, and an a-level data processor 240. Each data processor 230, 235, and 240 is configured to process data received from a respective query interface and transmit a respective data bundle (as processed) to a data package integrator 250. The data processors 230, 235 and 240 operate on their respective data types in accordance with the AI model routine so as to further process the data received from the query interfaces within the AI polling grid 200. Processing performed at the privacy gateway 205 may include, but is not limited to, assigning priority weighting to data indicating relevance of data to the query, additional masking of information as may be warranted for subsequent communication of the data to the data archival service 260, if warranted, generation of a request for further authentication of the source of the query and secondary authorization for the data release, or a combination thereof. Positioned subsequent to the privacy gateway 205 is the data package integrator 250, which is configured to generate an integrated data bundle comprised of data (for example, all data) received from the data processors 230, 235, and 240 and to transmit the integrated data bundle to the data archival service 260, which may be provided as a cloud service. As illustrated in FIG. 2, in some embodiments, a firewall 265 may be digitally located between the data package integrator 250 and the data archival service 260 for security purposes.

The data package integrator 250 may send additional data to the data archival service 260 (within the integrated data package or separate but associated with the integrated data package). For example, for auditing purposes, the data package integrator 250 may also receive and transmit send metadata regarding the original request for information and operation the AI engine, such as, for example, how the request was parsed or processed, what data repositories were accessed, and the like.

The data archival service 260 include one or more repositories for the data collected via the AI engine 150 via the one or more queries (the integrated data package). In addition to storing the data, the data archival service 260 may process the integrated data package in various ways. For example, the data archival service 260 may be configured to time stamp when data is accessed and by whom, rank received data based on time sensitivity, index received data by risk, relevancy, priority, or category, or perform any combination of these processing tasks. The data archival service 260 may also function as a gatekeeper controlling access to the received data by providing various security mechanisms for managing access to stored data.

As illustrated in FIG. 2, the data archival service 260 interfaces with the command system 140 to provide access to stored data. For example, authorized users of public safety agencies (referred to as "operators" herein) may access data stored in the data archival service 260 through the command system 140. The data archival service 260 may respond to specific requests for stored data. Alternatively or in addition, the data archival service 260 may push data to operators of the command system 140, such as by setting various flags checked by the command system 140, elevating presentation of particular data based on identified risks or priorities, and route data to a GUI presented via the command system 140 accordingly (for example, highlighting priority data and status). Accordingly, through the GUI, the command central operator can review AI prioritized telemetry flags and resource recommendations.

Figure 3:
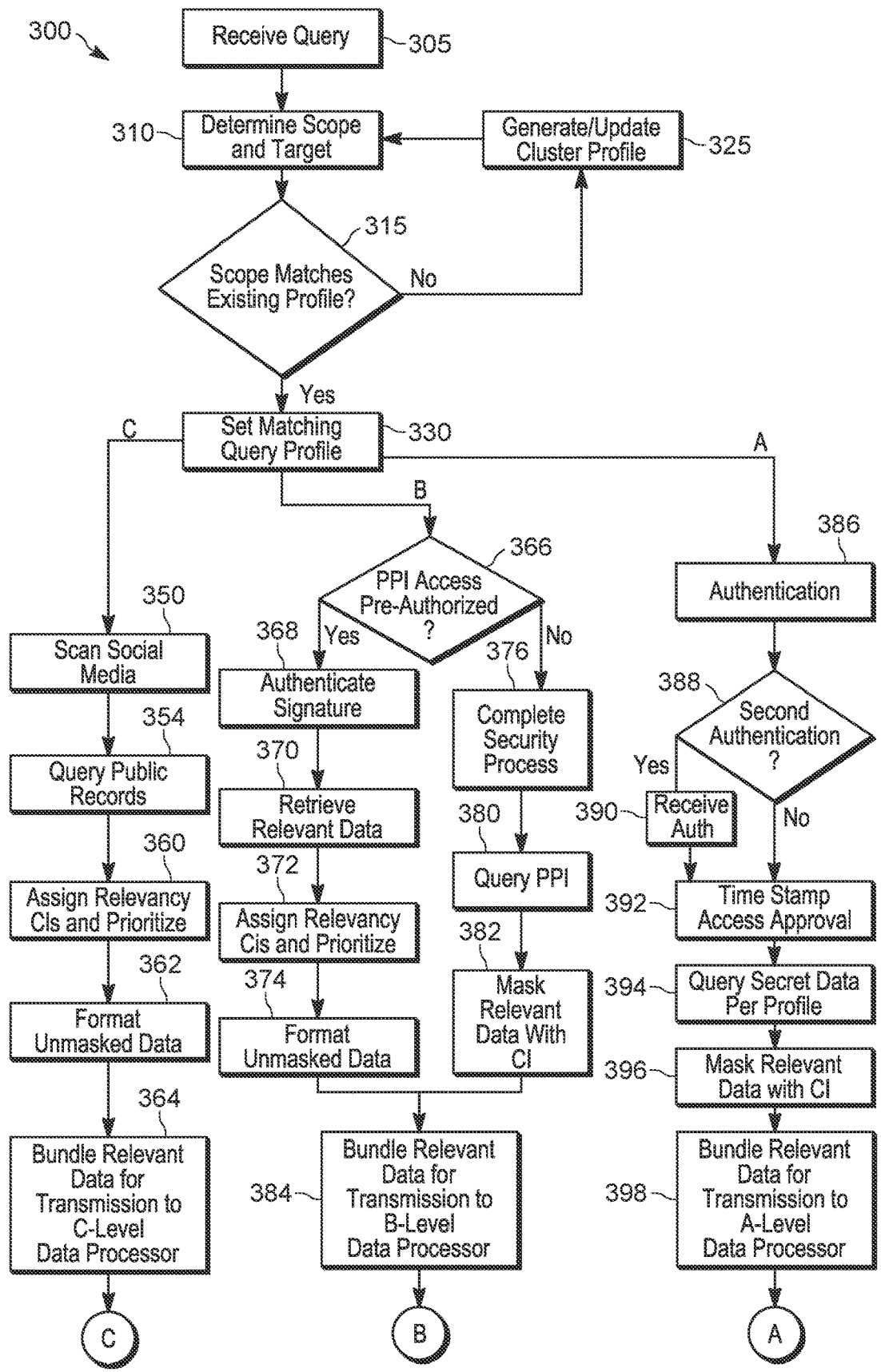
FIG. 3 illustrates a process flow of a query portal and an AI polling grid included in the AI engine of FIG. 2 in accordance with some embodiments.

FIG. 3 illustrates a process flow 300 of the query portal 130 and the AI polling grid 200 according to some embodiments. It should be understood that the functionality described herein as being performed by the query portal 130 and the AI polling grid 200 can be distributed in various ways. For example, in some embodiments, functionality described herein as being performed via the query portal 130 (or a portion thereof) may be performed by the AI polling grid 200 (for example, the query router 210).

As noted above, the AI polling grid 200 provides server access control to respond to a query received via the query portal 130 and is configured to mask and unmask data and perform relevancy prioritization of data collected from the various sources (servers).

As illustrated in FIG. 3, in response to receiving a query (at block 305), the query portal 130 determines a scope or target of the query (for example, the "who," "what," "when," and "why" of the query) (at block 310). In some embodiments, the scope of the query is set by selecting the query domain and one or more AI model vectors, which are subsequently included in the query cluster profile. When a query is submitted to query portal 130, a query domain is selected so as to classify the query type. The query domain may be set by choosing from a pre-defined itemization of domains (for example, medical background review, judicial background review, incident emergency, threat analysis, or the like) or by entering a "key word search" that highlights the nature of the query (for example, entering an incident specific keyword). Each domain is matched to a predefined model (or set of models) that is optimized for identifying relevant information as may be discovered when searching large volumes of data within data repositories. In other words, the query domain helps determine which AI model(s) are used to process the recovered data so as to determine data relevance to a given request for information.

In some embodiments, after determining a query domain, an additional step is taken wherein at least one sub-category (or multiple sub-categories) is selected to further refine the scope of the query. The domain sub-categories may be selected from a predefined itemization of entries associated with a particular domain or by entering a "key word search" that highlights a principle focus of the query with a domain. In some embodiments, the selection of the one or more sub-category(s) identifies the model states (for example, model vectors and search variables) that are used as reference targets when correlating information for relevance to the query. For example, a domain "medical background review" may include sub-categories, such as, but not limited to, prescription medication (past and present), documented disabilities, surgery history (past and scheduled), mental health diagnosis, physiological diagnosis, immunization status, travel records for a specified time range, medical insurance data, attendant physician/medical practitioner information, related sub-categorizations that are specific to a particular medical condition and status as may be applicable to the query, or a combination thereof. In another example, a query domain "judicial background review" may include as its sub-categories civil related sub-categories, criminal related sub-categories, military related sub-categories, or a combination thereof, such as, for example, personnel records, arrest records, juvenile records, homes address (past and present), employment history, educational records, firearm licensing, other related sub-categories as may be germane to an investigative effort, or a combination thereof These query domains and sub-categories are used by the query portal 130 to determine the query scope or target by translating the query into one or more AI model and associated model states that are incorporated in the query cluster profile. By affiliating AI model(s) with a particular query domain and selecting targeted AI model states (or reference variables) based on the sub-categories within each query domain, the query portal 130 bounds the scope of the query so as to ensure relevant information is targeted, while ignoring less relevant information. It should be noted that a trigger threshold for rejecting unrelated data within a query domain, or data deemed to be less relevant to the query, may also be set when entering a query at the query portal 130. Specifically, a threshold may be associated with a confidence interval (CI) or correlation factor, or combination thereof, wherein a CI is calculated for a determined correlation factor associated with personal data. The CI indicates the confidence that the correlation factor is accurate, while the correlation factor itself indicates the relevance of the data to the query. A threshold may be set such that a correlation factor must be greater than a predetermined threshold (for example, 0.65 representing a 65% probability that information is relevant out of a 100% relevance scale), wherein a high CI (for example, 0.95 representing a 95% confidence that correlation is accurate on a 100% scale), for data to be returned in a query search. When one or both of these thresholds is not exceeded, then the data may not be returned at all or may be further processed to further obfuscate any personal data.

Accordingly, the query cluster profile defines the one or more data repositories that are to be queried and how to process data retrieved from these repositories. In some embodiments, the query portal 130 is configured with a set of default query cluster profiles that correspond to common or well-established queries. Accordingly, the query portal 130 can translate the query to a query cluster profile by comparing the determined scope of the received query to existing cluster profiles (at block 315). As noted above, each cluster profile defines one or more data repositories to query and includes at least one AI model and associated model vectors. Each cluster profile may be mapped to a scope and other query variables. In response to the determined scope not matching an existing query cluster profile or in response a request that is deemed unrelated to the pre-defined AI models (at block 315), an AI model generator is used to generate one or more new AI models and associated model vectors that more accurately align with a query request and may be incorporated within a cluster profile so as to augment the scope and the array of existing cluster profiles. The model repository (containing all appropriate AI models used in the AI query system) is updated to include the newly generated models and model vectors, and the newly created query cluster profile may also be archived for future use (at block 325). Query cluster profile generation is described in more detail below. However, in some embodiments, a new query cluster profile can be generated by identifying a closest matching query cluster profile and determining a variance between the scope associated with the closest matching query cluster profile and the scope of the received query. This variance can be used to generate a new query cluster profile (or update an existing query cluster profile). In some embodiments, a generated query cluster profile is presented to a user for authorization prior to being added to the array.

As illustrated in FIG. 3, in response to generating a cluster profile or identifying a legacy query cluster profile matching the scope of the received query, the matching cluster profile is set as the cluster profile for the query (at block 330). As noted above, the query cluster profile defines one or more data repositories, and the query router 210 uses the query cluster profile to access information in the one or more data repositories to generate a response to the received query. The query router 210 uses the c-level, b-level, and a-level query interfaces 215, 220, and 225 to query the data repositories. For example, each c-level data repository identified via the cluster profile is queried via the c-level query interface 215 and, in some embodiments, may begin at block 315 to review social media (see the "C" path in FIG. 3 from block 315); each b-level data repository identified via the profile is queried via the b-level query interface 220 and, in some embodiments, may begin at block 366 to determine authorization (see the "B" path in FIG. 3 from block 315); and each a-level data repository identified via the cluster profile is queried via the a-level query interface 225 and, in some embodiments, may begin at authentication block 386 to grant permission for access (see the "A" path in FIG. 3 from block 315). In some embodiments, the AI query system 100 is Criminal Justice Information Services (CJIS) compliant (as defined by the Federal Bureau of Investigation) and uses CJIS-compliant application programming interface (API) calls to access data repositories.

With respect to the "C" path in FIG. 3 (performed via the c-level query interface 215), a search is performed as specified by the cluster profile. This search can include scanning social media, such as, for example, via a "web crawler" configured to systematically browse the World Wide Web using AI directed search engines according to the profile correlated to links, likes, words, locations, and the like (at block 350). Data collected via this crawler can be archived along with information regarding the source of the data.

The search of c-level repositories may also include querying one or more public data repositories (at block 354). These records may include DMV records, warrants, arrests, or other publicly accessible databases. The data items collected by of the social media scan (at block 350) and the query of public data repositories (at block 354) are assigned, via a correlation engine, a relevancy correlation factor and may include an associated confidence interval (CI) as previously described (at block 360). In particular, as previously described, the correlation factor is generated using the AI model, which processes the retrieved data to correlate the relevancy of the data (similarity in subject) to the selected sub-categories that were previously entered and included in the cluster profile. The algorithm used to generate a correlation factor may or may not be the same for a given AI model (for example, the same or different for different data categorizations) and may vary depending on the data and what is the appropriate algorithm for generating a correlation factor for the data. The correlation factor and CI taken together indicate how well a particular data item correlates to the query target (a level of relevancy) of and the level of confidence that the correlation factor is accurate in determining if the collected data item is germane to the received query (relevance CI). Accordingly, the correlation factor and its associated CI, either individually or taken together, may be referred to herein as relevancy indicators, agnostic relevancy indicators, or PPI-agnostic relevancy indicators. The correlation engine used to assign the relevancy indicators is tailored to each query based on the query AI model(s) and associated states included in the cluster profile, wherein these model states change based on the scope or target of the query (for example, the "who," "what," "when," and "why" of the query). The relevancy indicators can be governed via the set query cluster profile, such as, for example, being compliant with a policy regimentation as represented by a particular AI model included in the query cluster profile. In some embodiments, the c-level query interface 215 also prioritizes data items (for example, based on the relevant correlation factors, associated CIs, time sensitivity of data items, or a combination thereof). The c-level query interface 215 also formats the data items as unmasked data (at block 362) given that the data items were collected via c-level data repositories and include, therefore, "public domain" information. After this processing, the data is bundled with other c-level data and associated relevancy indicators for transmission to the c-level data processor 230 (at block 364).

With respect to the "B" path in FIG. 3 (performed via the b-level query interface 220), a determination is made regarding whether access to a PPI data repository has been pre-authorized (at block 366). For example, similar to how an individual can pre-authorize their organs for donation (for example, when applying for a driver's license or other identification card) or grant authorization to a physician to receive medical records from a secondary care provide or physician, the system 100 may be configured to allow an individual to pre-authorization access of their PPI should the need arise, such as in a medical emergency. The pre-authorization may be for any use of PPI, or limited to access of specific PPI, or use of specific PPI in specific contexts. For example, an individual can authorize access to medical PPI in response to a medical emergency. These pre-authorizations can be stored within the system 100 or may be accessible by the system 100 only when an indent is verified as warranting access to PPI data, thereby allowing the system 100 to function as a centralized location for acquiring individual pre-authorizations and accessing the associated data from data repository B 145. In some embodiments, a target associated with the query can be used to check for pre-authorizations and the query cluster profile may define whether available pre-authorizations are relevant to the received query. In particular, when a query is not relevant to a medical emergency, the selected query cluster profile may not check for the existence of medically related pre-authorizations or the existence of any related PPI data.

In response to a PPI access request being classified as pre-authorized (at block 366), access to the data repository may be subsequently verified or authenticated (at block 368). For example, when making an access pre-authorization, an individual supplying the authorization may supply an electronic signature or other authentication means, which the b-level query interface 220 authenticates the legitimacy of its request for access and PPI data. After performing this authentication, data is retrieved according to the selected cluster profile and the pre-authorization limitations, if any (at block 370). The retrieved data is processed similar to data retrieved from c-level data repositories. In particular, as illustrated in FIG. 3, the retrieved data items are assigned relevancy indicators (at block 372) and formatted as unmasked (public) data (at block 374).

As illustrated in FIG. 3, in response to PPI access not being pre-authorized (at block 366), security challenges may be made (at block 376) to facilitate limited access to server or data repositories. Such security challenges may include, but are not limited to, using keys, certificates, or other access information included in the query cluster profile that verifies the source of the request and the legitimacy of a need to identify that certain targeted PPI data exists and triggers secondary authorization processes within the B-level repository data management system or personnel. After appropriate authorization is given to the query system 100 to access any PPI data resident on B-level data repositories, the AI engine 150 may begin searching the repository for relevant data (at block 380). In some embodiments, authorization to search a data repository for information is not the same as authorization to fully disclose PPI data. In other words, after PPI data is identified as possibly relevant to the query, the b-level query interface 220 may take steps to appropriately mask the PPI data retrieved from b-level repositories as may be appropriate to protect privacy. Accordingly, since the b-level data repositories include PPI, the b-level query interface 220 is also configured to mask PPI (at block 382). Masking of PPI data may include complete redaction of the PPI data as is done in legacy systems, or, alternatively, may be graduated by substituting the raw PPI with alternative data, where the alternative data is comprised of a combination of metrics appropriately scaled for disclosure to the query source that indicates the relevance and importance of the masked data to a query. This alternative data used in PPI masking may be a combination of metrics which includes, but is not be limited to, a simple acknowledgment that undisclosed PPI data exists, correlation indicators related to the undisclosed data, context flags indicating an interrelationship between various PPI data, digital directory information regarding where the masked PPI data is located, an assigned "priority index" associated with the query priority that ranks the risk, or the compelling public safety interest in gaining unfettered access to the PPI data, or both, or a combination thereof. Accordingly, masking may be scaled so as to fully redact one or more portions of PPI data having relevance indices below a certain threshold, while alternatively substituting one or more other portions of discovered PPI data with acknowledgements that undisclosed data exists, along with other metrics that help gauge the importance of the data so as to guide the query originator in follow-up action for full disclosure of the PPI data. Therefore, the masking agent that obfuscates the relevant PPI may be scaled based on relevancy indices, a query priority, and other indices as may be needed to help balance personal privacy against a compelling public safety interest for full disclosure of PPI data. For example, in some embodiments, masking data uses a query priority which is generated when compiling the query cluster profile, while other metrics used as masking data (for example, context flags) may be generated (for example, in real-time) by the AI engine 150 to help contextualize the PPI data. For example, PPI collected via the b-level query interface 220 can be replaced with the assigned relevancy indicators, as these indicators are PPI-agnostic. In some embodiments, the b-level query interface 220 may also use assign context flags generated by the AI engine 150 to mask PPI. For example, an individual on a legal watch list or with ancillary affiliations with a known extremist group that recently purchased a large volume of ammonium nitrate, may trigger a context flag for further investigation. In some embodiments, the b-level data processor 235 may compare a determined relevancy indices to a predetermined threshold (such as, as one non-limiting example, 95% when the CI is represented as a percentage from 0% to 100% representing a highest level of relevancy confidence) to determine whether to include b-level data in a response to the query. For example, collected data (PPI) that falls below a particular level of relevancy to the received query may be discarded or fully redacted within the b-level query interface 220 to prevent any dissemination of this PPI outside of the b-level query interface 220 for the particular received query.

As illustrated in FIG. 3, data collected with an access pre-authorization (blocks 368, 370, 372, and 374) and data collected without an access pre-authorization (blocks 376, 378, 380, and 382) is bundled for transmission to the b-level data processor 235 (at block 384).

With respect to the "A" path in FIG. 3 (performed via the a-level query interface 225), access data, such as security keys and other information included in the query cluster profile is used to access (for example, through a firewall) and authenticate the a-level query interface 225 with the a-level data repository (at block 386). In situations where secondary authentication is required (at block 388), this authentication can be requested and received (at block 390). This secondary authentication may be received from a supervisory agent tasked with securing secret data located in an a-level repository under their supervision. This may entail the supervisory agent using a terminal or other computing device communicating with the a-level query interface 225 so as to grant final permission for the a-level query interface 225 to access the data repository and set appropriate limitations for constraining access to sub-sections of the secret data. This secondary authentication can be performed using one or more security protocols, such as, for example, hypertext transfer protocol secure (HTTPS).

In response to receiving secondary authentication (at block 390) or in a situation where secondary authentication is not needed (at block 388), access approval is time stamped with an authorized identification number and a security level (for example, representing a level of access) (at block 392). This time stamped data may be stored for auditing purposes. The relevant data repositories are then queried as defined via the selected query cluster profile (at block 394). In some embodiments, the query cluster profile also provides links to the approved data repositories, including specific directory addresses and file names, for performing the queries. The retrieved data is formatted (for example, masked versus unmasked) and encrypted as applicable (for example, based on authorization) (at block 396) and the relevant data is bundled for transmission to the a-level data processor 240 (at block 398). Any masking performed via the a-level query interface 225 may be performed similar to masking performed via the b-level query interface 220 as described above.

Data collected by each of the query interfaces 215, 220, and 225 is transmitted to the AI privacy gateway 205. As illustrated in FIG. 2, the AI privacy gateway 205 includes a c-level data processor 230, a b-level data processor 235, and an a-level data processor 240 and each of the data processors 230, 235, and 240 may process data received from the respective query interface 215, 220, and 225. Accordingly, each query interface is configured to access a particular type of data repository (particular information categorization) and has a specified processing resource, which may include an assigned, dedicated data processor, or an appropriately partitioned processing system with secure partitioning between data bus management, buffering and processor resource allocations, so as to provide secure separation between each of the data processing domains represented by the data processors 230, 235, and 240. As noted above, this tiered and compartmentalized approach provides security and control as the different categorizations of data are handled by separate processing lanes within the system 100.

Figure 4:
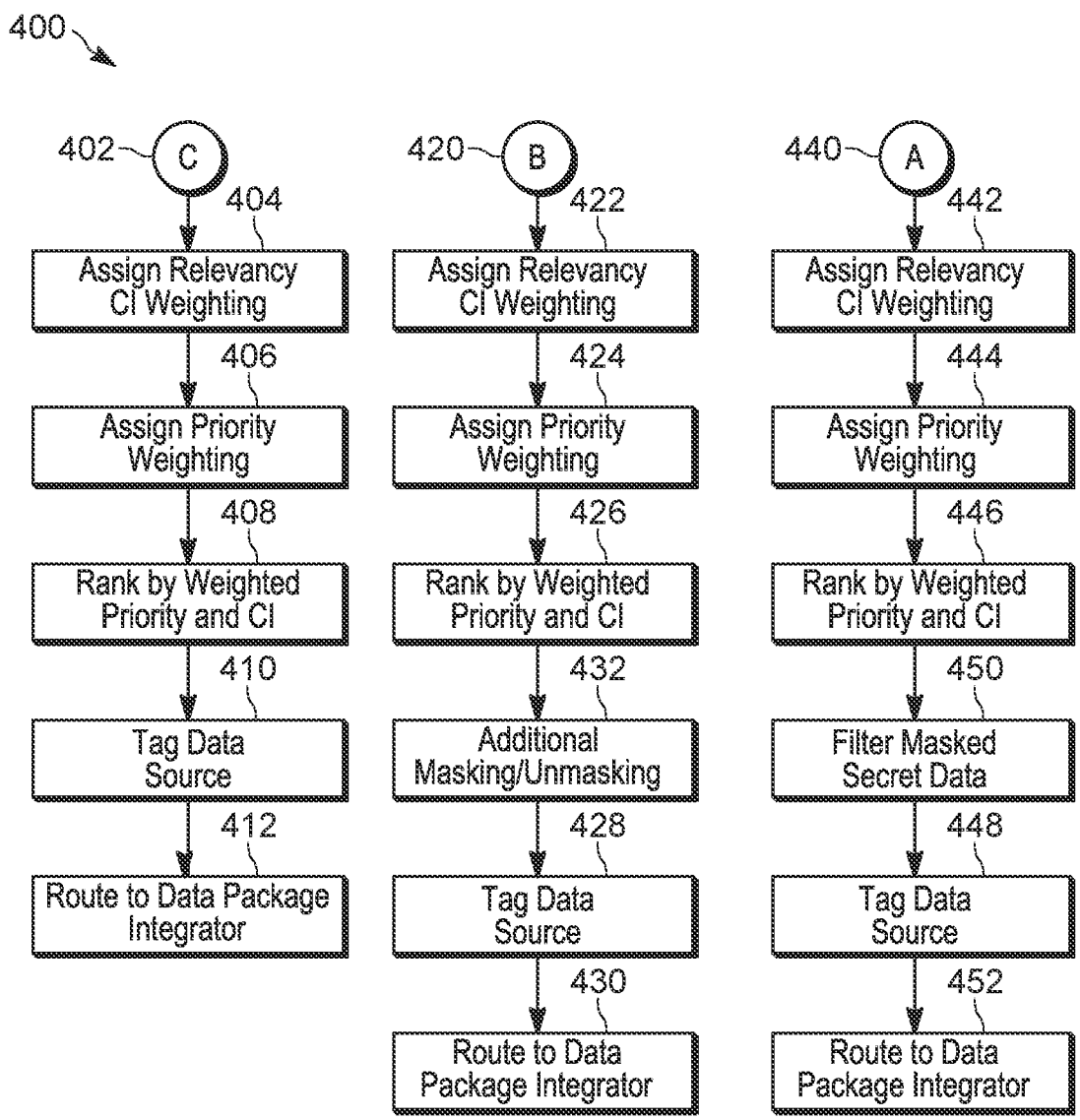
FIG. 4 illustrates a process flow of an AI privacy gateway included in the AI engine of FIG. 2 in accordance with some embodiments.

FIG. 4 illustrates a process flow 400 of the AI privacy gateway 205 according to some embodiments. As noted above, the AI privacy gateway 205 bundles data from data repositories representing different types or classification of information by relevance indicator(s) and priority ranking with time stamping. In some embodiments, the AI privacy gateway 205 also performs additional (for example, secondary) data masking and authentication for multi-streaming to additional data consumers. In some embodiments, this secondary data masking includes further processing of the previously masked data by completely redacting information, replacing previously unmasked data with appropriate relevancy indicators based on a relevancy indicators of the data to the query as described above with respect to the AI polling grid 200, or a combination thereof. Accordingly, the secondary masking performed in the AI privacy gateway 205 serves to further process PPI data and, in some embodiments, masking information more rigorously than what was performed in the first tier masking process at the query interfaces 220 and 225. This secondary masking process at the gateway 205 may facilitate the dissemination of received PPI information to additional query users that have limited (for example, more restrictive) authorizations and, therefore, are not entitled to access the totality of the received PPI and are thereby denied a more comprehensive understanding of the query response. This secondary masking may include expanding full redaction of some portion of PPI data, including relevancy indicators, or extension of the masking to include additional raw PPI by replacing the data with relevancy indicators, context flags, and other metrics as previously noted, As illustrated in FIG. 4, bundled data from the c-level query interface 215 is received by the c-level data processor 230 (at block 402). All data received from c-level query interface 215 is unmasked given this information is considered public domain. The c-level data processor 230 assigns relevancy indicator(s) values (at block 404) and a priority weighting (at block 406). The c-level data processor 230 also ranks and organizes the data from all c-level data repositories by their respective composite weighted priority and weighted relevancy (at block 408) and appropriately tags the data elements with source location associated with the c-level public data repositories wherein the original data was found (at block 410). As illustrated in FIG. 4, after the ranking and appropriately organizing (for example, ordering) the data, the c-level data (all the c-level data) is packaged and routed to the data package integrator 250 (at block 412).

Similarly, bundled data from the b-level query interface 220 is received by the b-level data processor 235 (at block 420). Data received from b-level query interface 220 may include PPI data that has been masked with appropriately generated masking data as previously described, PPI data that is unmasked based on pre-authorizations or compelling public safety interest rating of the original query, or a combination thereof. The b-level data processor 235 assigns relevance indictor(s) values (at block 422) and a priority weighting (at block 424). The b-level data processor 235 also ranks and organizes the data from the b-level data repositories by weighted priority and relevance indicator (at block 426) and appropriately tags the data elements with the source location associated with the b-level public data repositories (at block 428). The ranked and appropriately organized (for example, ordered) data from the b-level data repositories is then routed to the data package integrator 250 (at block 430).

As illustrated in FIG. 4, in some embodiments, the b-level data processor 235 also performs secondary or additional masking or unmasking of one or more data items received from the b-level query interface 220. For example, as noted above, the b-level data processor 235 may also be configured to verify authorization for a particular data repository (for example, based on the query cluster profile) to determine whether additional masking is needed to disseminate (via multi-streaming) the received information to additional data consumers (for example, other systems or data archival services) (at block 432).

As illustrated in FIG. 4, bundled data from the a-level query interface 225 is received by the a-level data processor 240 (at block 440). Data received from a-level query interface 225 is usually fully masked with appropriately generated masking data as previously described given this data is rated secret. The a-level data processor 240 assigns a relevance indicator(s) weighting (at block 442) and a priority weighting (at block 444). The a-level data processor 240 also ranks and orders the data by weighted priority and relevance indicators (at block 446) and tags the data with the source location associated with a-level secret data repositories (at block 448) as described above with respect to the c-level and b-level data processors 230 and 235. In some embodiments, the a-level data processor 240 also determines whether to include all masked data, or a portion or the received data, and/or which portion of the a-level masking information in a response to a given query, which may involve comparing security ratings of the data recipients to appropriately filter data in accordance with the recipients' security authorizations (at block 450). The ranked (and filtered) data is then routed to the data package integrator 250 (at block 452).

As described above with respect to FIG. 2, the data package integrator 250 can combine the data received from the a-level data processor 240, the b-level data processor 235, and the c-level data processor 230 to generate an integrated data package that is passed (through the firewall 265) to the data archival service 260. In some embodiments, the data package integrator 250 can combine the data from the data processors 230, 235, and 240 based on priority and relevancy indicator(s). As noted above, the data archival service 260, in combination with the command system 140, can be configured to generate and push alerts and notifications to highlight sensitive or priority data. As also noted above the data archival service 260 may provide data that includes, for example, the query cluster profile used to build the integrated data bundle, associated authorization records, masking data metrics, and directory locations where the source (unmasked) data is stored.

After the appropriate data has been retrieved in response to a received query, in combination with any associated masking data, additional information can be generated by AI engine 150 and provided to the archival service 260 as may be appropriate. The AI engine 150 may also review both the query data and the query source itself to determine behavioral profile(s). Behavioral profiles may include, but are not limited to, query target behavioral profiles (QTBP) and query source behavioral profiles (QSBP), wherein pattern recognition algorithms process the appropriate data accumulated of a particular time window so as to uncover unanticipated patterns within a data population. For example, a QSBP may be created by analyzing the number of queries, query types, query targets, and allowed exceptions, which may have been originated from a particular query source, as compared to the recognized roles and responsibilities for that query originator, to detect unexpected patterns that may indicate abuse of the query system 100. These QSBP(s) may indicate excessive requests for targeted PPI from individual or multiple sources in the same department, or query requests that do not align with the source roles and responsibility (for example, a DMV query directed to providing PPI regarding prescription medications for an individual), which may then be flagged and forwarded to appropriate supervisory agencies for review. In addition to QSBTs, query data based QTBP(s) may be generated by analyzing data from the data processors 230, 235, and 240 to derive behavioral profile(s) regarding a query target, so as to reveal non-obvious patters relevant to a query target. For example, query PPI data may be analyzed by the AI engine 150 to detect unexpected behavioral patterns in travel, purchases of both type and quantity of restricted or regulated merchandise (for example, prescription drugs purchases by individuals or affiliated groups that exceed medically sanctioned prescription quantities or refill scheduling), indirect association with individuals or organizations listed on specified "watch lists" inconsistent with nominal lifestyles or professional practices, or the like, which may then be flagged and forwarded to appropriate supervisory agencies for review. It should be noted that PPI based QTBP is inherently bounded by the nature of the data that is being analyzed, given the data generated based on a query is limited by the query scope, and other target limits of the query, which is a "built in" safeguard that protects privacy in compliance with applicable public policy and law. Consequently, the information in both QSTP and QTBP can be used to reinforce transparency and auditing rigor when ensuring the proper use of the query system 100.

Figure 5:
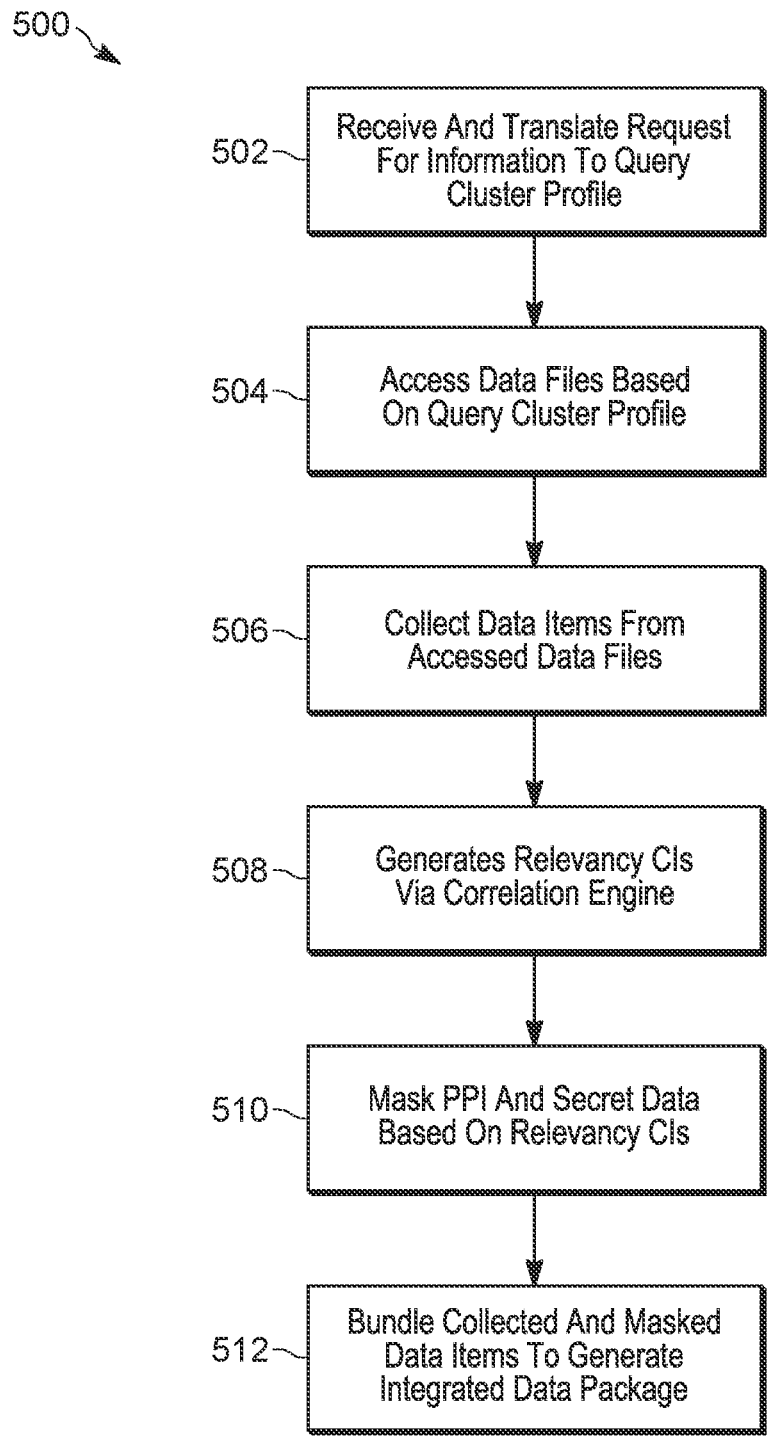
FIG. 5 is a block diagram illustrating dynamic AI modeling associated with cluster profiles used by the AI query system of FIG. 2 in accordance with some embodiments.

Accordingly, bringing together the process flows of the AI polling grid 200 and the AI privacy gateway 205, FIG. 5 is a flowchart illustrating a method 500 performed by the AI query system 100 to respond to a request for information. The method 500, as described herein, may be performed via the computing device 105 through processing by the AI engine 150. However, the functionality described with respect to method 500 can be distributed in various ways among multiple software modules, devices, and systems.

As illustrated in FIG. 5, the method 500 includes receiving a request for information and translating the request for information into a query cluster profile (at block 502). As noted above, in some embodiments, the query cluster profile includes a query type, a priority, a policy model, an authentication signature or a combination thereof. As previously noted, the query cluster profile includes information regarding the query scope and target, and query indicators, which set which AI model(s) and variable(s) that are used during the search of data repositories in response to the received query. Information that bounds the query (for example, sets the query scope and target) is typically entered into the query portal 130 by the query originator, while query indicators are derived from the query scope parameters so as to enable the query search using AI models. This translation may be performed via the query portal 130, the AI polling grid 200, or a combination thereof Based on the query cluster profile identified via the translation of the request for information, a plurality of data repositories (data files stored within such data repositories) are accessed (at block 504). As discussed above, the data repositories accessed by the AI query system 100 include different types or categorizations of information. Accordingly, accessing the data files incudes accessing different data files storing different types of information categorizations. For example, using the three query interfaces 215, 220, and 225 described above with respect to FIG. 2 as one example, accessing the data files includes accessing a first data file storing data items categorized as general public data (via the c-level query interface 215), a second data file storing data items categorized as personal private information (PPI) (via the b-level query interface 220), a third data file storing data items categorized as secret or private data (via the a-level query interface 225), or a combination thereof. In other words, a plurality of query interfaces can be used to access various data files, wherein each query interface is configured to access data files storing a particular categorization of information. As noted above, using sectioned query interfaces, which can be realized using physically different interfaces or by incorporating a data management strategy that precludes the exchange (mixing) of information during transmission and processing of different data types (for example, c-type, b-type, and a-type), or a combination thereof, is intended to provide a tiered and compartmentalized approach to responding to the request for information. This query interface compartmentalization is intended to prevent unintended access to PPI data by unauthorized operators.

With respect to accessing a-level data files, an authentication signature included in the query cluster profile may be used (via the a-level query interface 225) to access data files storing data categorized as secret data. Also, in some embodiments, the a-level query interface 225 is configured to determine whether secondary authentication (for example, from an authorized human user) is needed to access a data file and obtain such secondary authentication as needed.

Data items are collected from the accessed data files (at block 506). For example, again using the three query interfaces 215, 220, and 225 described above as one example, a first set of data items associated with the request for information is collected from the first data file, a second set of data items associated with the request for information is collected from the second data file, a third set of data items associated with the request for information is collected from the third data file, or a combination thereof. As is apparent to those skilled in the art, data repository C may be one repository or a plurality of data repositories having a particular type of data resident in its directories (c-type), while data repository B may be physically the same as, or different from, data repository C, except data repository B will contain b-type data resident in its directories. In like manner, data repository A may be a single source or a plurality of data repositories that are physically the same as, or different from, data repository C and data repository B, except data repository A is identified as having a-type data resident in its directories.

As noted above, as part of collecting data items from b-level data repositories, the AI query system 100 (the b-level query interface 220) may be configured to identify whether an access pre-authorization exists and, if so, authenticate the access pre-authorization. PPI collected as part of an authenticated pre-authorization is formatted by the b-level query interface 220 as unmasked data (similar to general public data collected via the c-level query interface 215).

An AI correlation engine is applied to the collected data to determine relevancy indicators (at block 508). For example, for the second set of data items, the AI correlation engine is applied to determine PPI-agnostic relevancy indicators for PPI included in the second set of data items. Similarly, for the third set of data items, the AI correlation engine is applied to determine secret data relevancy indicators that are agnostic to the raw secret data included in the third set of data items. In some embodiments, the relevancy indicators generated by the AI correlation engine are compliant with a policy model included in the query cluster profile.

As illustrated in FIG. 5, the method 500 also includes masking, based on the query cluster profile, data items collected from b-level data repositories and a-level data repositories by replacing the data items with relevancy indictors or other masking data (at block 510). For example, PPI included in the second set of data items may be replaced with the PPI-agnostic relevancy indicators and secret data included in the third set of data items may be replaced with appropriate masking data, such as, for example, relevancy indicators or other masking data that at least acknowledges the existence of data germane to the query without revealing specifics. The relevancy indicators replacing the data items may also be associated with a query domain and category as previously described.

After data masking is performed, the collected (and masked as applicable) data items from all data-type repositories are bundled together to generate an integrated data package (at block 512). In some embodiments, similar to how different query interfaces are used for different information categorizations, a plurality of data processors or processing system(s) initially bundle collected data items, wherein the output from each data processor is provided to the data package integrator 250 as described above, which generates the integrated package. In this embodiment, each data processor is configured to receive data items collected from data files storing particular categorization of information. In other words, each query interface can be associated with a dedicated data processor configured to bundle data items collected via the query interface. Alternatively, the bundling of information received by each query interface may be processed using a single processor appropriately configured such that the data processing and communication from each query interface is functionally partitioned based on data type so as to guard against inadvertent assess of information between data flows of differing data types. The segmented data processors may be configured to process collected data files in various ways. For example, the data processors may assign weights to the relevancy indicators and priorities assigned to collected data items (for example, via the relevant query interface). The data processors may use the weighted relevancy indicators and weighted query priorities to rank data items before transmission to the data package integrator 250. Also, for b-level data, the data processor may be configured to mask or unmask additional data included in the data collected from the b-level data files. In some embodiments, the additional or secondary masking or unmasking is performed to allow the collected data (or a portion thereof) to be disseminated to other data consumers (that may require further masking or may have different authorizations where less masking is required). When compiling the various data packages from the processors in the AI privacy gateway 205, data package integrator 250 may also group data segments together having a similar priority rating, relevancy indicators, or combinations thereof (at block 512). This compilation strategy may be accomplished agnostic to the data type, so as present the most important or relevant data segments(s) in a fashion that highlights data importance and accessibility, regardless of the source of the data segment itself.

The integrated data package is also communicated, as a response to the request for information, to a data repository accessible by authorized users of a public safety agency (at block 512).

As described above, the AI module cluster profiles are used by the AI polling grid 200 to access and query data repositories relevant to a scope of a request for information, wherein the profiles (which may be stored in cloud storage) are mapped to a category, query request priority, relevancy indicators, authentication requirements, or a combination thereof. The profiles can be generated via an AI model generator based on one or more variables. In some embodiments, the one or more variables include a query type, a correlation to the received query and associated confidence interval, a policy rating, a PPI sensitivity, a VPSI sensitivity, a time sensitivity, a statutory restriction, an authorization requirement, and masking criteria.

Figure 6:
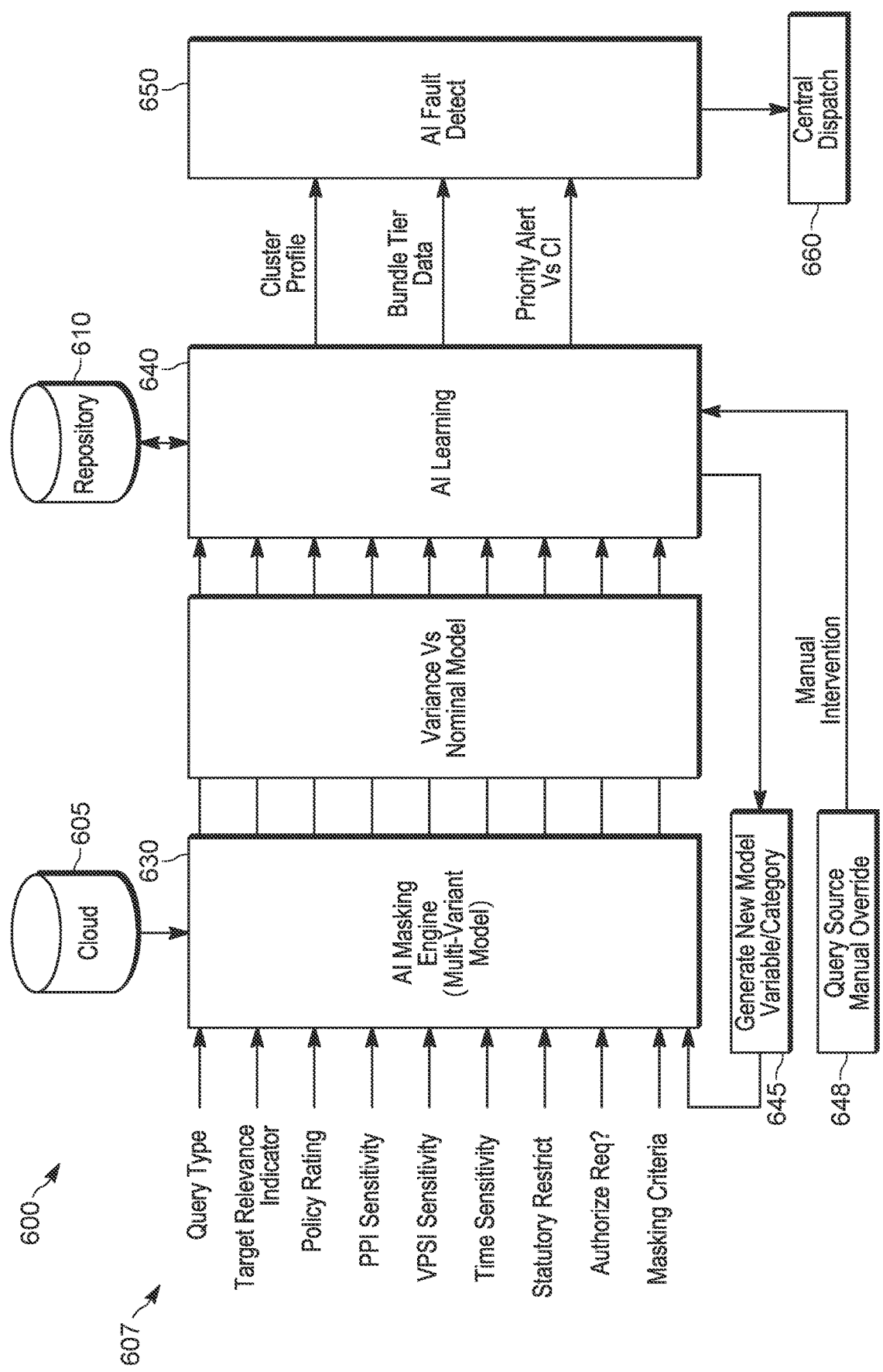
FIG. 6 is a process flow for operating and updating the AI query system of FIGS. 1A and 1B in accordance with some embodiments.

For example, FIG. 6 is a block diagram 600 of an AI dynamic model associated with the AI model learning processes as performed by the AI engine 150 when processing query cluster profiles. As illustrated in FIG. 6, default query cluster profiles may be stored in a cloud 605 so as to provide an initial query scope and target based on previous queries or assumed query search applications. These default profiles set a default query domain, sub-category, request priority, and authentication information and may be downloaded from the cloud 605. The constituent components of a default profile may then be edited (as inputs 607) so as to more precisely tailor a query profile to the received query. As described above, the AI engine 150 is a multi-variable model that functions as a masking engine (at block 630) wherein the profiles from a received query request are processed by scope, target, request priority, and authentication credentials verifying who is making the request, what the request relates to, why the request is being made, when the request is being made, and a priority associated with the request. This information is used to determine the AI model(s) and model variables that generate the correlation factors, data ranking, priorities, and confidence intervals which result when processing any data found as part of the query execution. In addition, AI model(s) and model variables may be adapted to meet the requirements of specific data repository(s) that are to be accessed, given not all data repositories (data repositories A, B, and C) utilize the same data format, operating systems, or authorization processes. These profile specific AI model(s), model variables and all relevant search metrics, including query originator telemetry, may be store for future reference in an AI model repository 610.

After the query target and scope are accurately bounded by appropriately modifying query cluster profile and the AI model(s) and model variables have been adapted to match the optimized query cluster profile, as illustrated in FIG. 6, the AI engine 150 may also quantify the differences between the original default profile and the optimized cluster profile (at block 640). Tracking edits to existing default cluster profiles over time (at block 640) facilitates the identification of model type and parametric trends that can be used to create additional or updated default cluster profiles to enhance efficacy in query processing. Accordingly, when a query cannot be adequately represented by a default profile, or needs further customization for any reason, the variance between the determined scope and target and the closest matching profile may be detected in an AI learning engine 640 and new models, along with affiliated model parameters, may be generated at model generator 645. Continuously tracking AI model variance ensures continuous model relevance to continuously evolving query types and classifications. Consequently, the AI learning model 640 tracks frequencies of queries by domain, and the domain sub-categories, as well as the query originating source and scope and, hence, can identify query patterns that are used to generate a new default cluster profiles, and may even be extended to facilitate creation of new AI model(s) and associated sub-category (based on relevancy indicators, existing profiles, changes in policy and legal requirements, or a combination thereof). As also noted above, in some embodiments, the system 100 provides a query source manual override (at block 648), wherein a user can manually intervene and modify or create a query cluster profile or expedite authorization processes should the urgency of a public safety incident warrant it.

As also illustrated in FIG. 6, the integrated data package and associated information (for example, an identifier of the query cluster profile used or the actual query cluster profile used and other auditing information or information included in the integrated data package) can be used to detect faults, query abuses, or other outlier information requests or associated responses (at block 650). For example, extra-ordinary requests (based on source and query type) can result in the generation of a flag that prompts a user (at central dispatch block 660) for AI-assisted human response and follow-up.

In other words, different query cluster profiles are generated based on the submitted query requests and associated AI modeling of standing law, policy, and community standards for the purpose of verifying the existence of relevant PPI and its importance to compelling public safety interests without revealing the actual PPI or secret data specifics. The query cluster profiles may be adjusted based on authorization, change of laws, or cordiality of public interest. Also, outcome parameters as well as human feedback can be feed back into the system 100 to further train and refine the AI engine 150.

Accordingly, embodiments described herein provide an AI query or arbitration system that uses a tiered file access system that complies with applicable legal, policy and community standards to protect (mask) PPI while still providing relevant indication of existing data for approved public safety agencies to act on and which may be accessible for follow-up consideration (for example, warrants and human intervention to access or unmask data). The system uses an adaptable AI engine (not a fixed template) to determine relevancy indicators, relevancy priorities, and other information pertinent to the query as replacement (masking) data for actual data for obfuscation purposes. In other words, in some embodiments, rather than just redacting data, the AI engine masks PPI by substituting actual data with correlation indicators and CI to provide inferences as to the existence of PPI data and its importance to the query. The masked data is bundled with data from other sources (public and private data repositories) using priority ratings compliant with a query cluster profile, wherein the query cluster profile is based on AI modeled tiering of various data types. The relevance indicators are useful to identify follow-up actions to access and unmask specific targeted data as may be warranted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An artificial intelligence (AI) query system comprising:
   a query portal configured to translate a request for information into a query cluster profile, the query cluster profile including a query type and a priority;
   an AI polling grid configured to:
      access, based on the query cluster profile, a plurality of data files, the plurality of data files including a first data file storing data items categorized as general public data and a second data file storing data items categorized as personal private information (PPI),
      collect a first set of data items associated with the request for information from the first data file,
      collect a second set of data items associated with the request for information from the second data file,
      apply an AI correlation engine to the second set of data items to determine PPI-agnostic relevancy indicators for PPI included in the second set of data items, and
      mask, based on the query cluster profile, the second set of data items by replacing the PPI included in the second set of data items with the PPI-agnostic relevancy indicators; and
   an AI privacy gateway configured to:
      receive the first set of data items and the second set of data items, as masked, from the AI polling grid,
      generate an integrated data package based on the first set of data items and the second set of data items, as masked, and
      communicate the integrated data package, as a response to the request for information, to a data repository accessible by authorized users of a public safety agency.

2. The system of claim 1, wherein the query cluster profile further includes a policy model, wherein the PPI-agnostic relevancy indicators are compliant with the policy model.

3. The system of claim 1, wherein the AI polling grid is further configured to authenticate an access pre-authorization and, in response to authenticating the access pre-authorization, format PPI included in the second set of data items associated with the access pre-authorization as unmasked data.

4. The system of claim 1, wherein the query cluster profile further includes an authentication signature, and the plurality of data files further include a third data file storing data categorized as secret data,
   wherein the AI polling grid is further configured to use the authentication signature included in the query cluster profile to access the third data file, collect a third set of data items associated with the request for information from the third data file, and apply a second AI correlation engine to the third set of data items determine agnostic relevancy indicators for secret data included in the third set of data items, and mask, based on the query cluster profile, the third set of data items by replacing the secret data included in the third set of data items with the agnostic relevancy indicators; and
   wherein the AI privacy gateway is further configured to receive the third set of data items, as masked, from the AI polling grid and wherein the AI privacy gateway is configured to generate the integrated data package based on the first set of data items, the second set of data items, and the third set of data items.

5. The system of claim 4, wherein the AI polling grid is further configured to receive secondary authentication prior to accessing the third data file.

6. The system of claim 1, wherein the AI polling grid includes a plurality of query interfaces, the plurality of query interfaces including a first query interface configured to access the first data file and a second query interface configured to access the second data file.

7. The system of claim 6, wherein the AI privacy gateway includes a plurality of data processors, each of the plurality of data processors configured to receive a set of data items from one of the plurality of query interfaces.

8. The system of claim 1, wherein the AI privacy gateway is further configured to mask or unmask additional data included in at least one of the first set of data items and the second set of data items and disseminate the additional data, as masked or unmasked, to a second data repository.

9. The system of claim 1, wherein the AI privacy gateway is further configured to assign weights to the PPI-agnostic relevancy indicators.

10. The system of claim 9, wherein the AI privacy gateway is further configured to assign weights to priorities of data items included in the first set of data items and the second set of data items.

11. The system of claim 10, wherein the AI privacy gateway is further configured to rank the data items included in the first set of data items and the second set of data items based on the weighted PPI-agnostic relevancy indicators and the weighted priorities.

12. A method of generating a response to a request for information using an AI engine, the method comprising:
   receiving the request for information;
   translating the request for information into a query cluster profile, the query cluster profile comprised of at least a query type and a priority;
   accessing, with the AI engine based on the query cluster profile, a plurality of data files, the plurality of data files including a first data file storing data categorized as general public data and a second data file storing data categorized as personal private information (PPI);
   collecting, with the AI engine, a first set of data items associated with the request for information from the first data file;
   collecting, with the AI engine, a second set of data items associated with the request for information from the second data file;
   applying, with the AI engine, an AI correlation engine to the second set of data items to determine PPI-agnostic relevancy indicators for PPI included in the second set of data items,
   masking, with the AI engine based on the query cluster profile, the second set of data items by replacing the PPI included in the second set of data items with the PPI-agnostic relevancy indicators;
   generating an integrated data package based on the first set of data items and the second set of data items, as masked; and
   communicating the integrated data package, as the response to the request for information, to a data repository accessible by authorized users of a public safety agency.

13. The method of claim 12, further comprising, in response to authenticating an access pre-authorization, format PPI included in the second set of data items associated with the access pre-authorization as unmasked data.

14. The method of claim 12, wherein accessing the plurality of data files includes accessing a third data file storing data categorized as secret data using an authentication signature included in the query cluster profile and secondary authorization, and further comprising collecting a third set of data items from the third data file, applying a second AI correlation to the third set of data items to determine agnostic relevancy indicators for secret data included in the third set of data items, and masking, based on the query cluster profile, the third set of data items by replacing the secret data included in the third set of data items with the agnostic relevancy indicators, wherein generating the integrated data package includes generating the integrated data package based on the first set of data items, the second set of data items, and the third set of data items.

15. The method of claim 12, wherein accessing the plurality of data files includes accessing the first data file via a first query interface and accessing the second data file via a second query interface.

16. The method of claim 15, further comprising, prior to generating the integrated data package, receiving, at a first data processor, the first set of data items from the first query interface and receiving, at a second data processor, the second set of data items from the second query interface.

17. The method of claim 12, further comprising masking or unmask additional data included in at least one of the first set of data items and the second set of data items and disseminating the additional data, as masked or unmasked, to a second data repository.

18. Non-transitory computer-readable medium storing instructions, that when executed by an electronic processor, perform a set of functions, the set of functions comprising:

receiving a request for information;

translating the request for information into a query cluster profile, the query cluster profile comprised of at least a query type and a priority;

accessing, based on the query cluster profile, a first data file storing data categorized as general public data with a first query interface to collect a first data bundle associated with the request for information;

accessing, based on the query cluster profile, a second data file storing data categorized as PPI with a second query interface to collect a second data bundle associated with the request for information;

applying, at the second query interface, an AI correlation engine to determine PPI-agnostic relevancy indicators of PPI included in the second data bundle;

masking, based on the query cluster profile, the PPI included in the second data bundle by replacing the PPI with the PPI-agnostic relevancy indicators;

generating an integrated data package based on the first data bundle and the second data bundle, as masked; and communicating the integrated data package, as a response to the request for information, to a data repository.

19. The non-transitory computer-readable medium of claim 18, the set of functions further comprising accessing, based on an authentication signature included in the query cluster profile, a third data file storing data categorized as secret data with a third query interface to collect a third data bundle associated with the request for information, wherein the integrated data package is based on the first data bundle, the second data bundle, and the third data bundle.

20. The non-transitory computer-readable medium of claim 18, the set of functions further comprising masking or unmasking additional data included in at least one of the first data bundle and the second data bundle and disseminating the additional data, as masked or unmasked, to a second data repository.

* * * * *